US008623437B2

(12) United States Patent
Newsom

(10) Patent No.: US 8,623,437 B2
(45) Date of Patent: Jan. 7, 2014

(54) COMBINATION BREADSTICKS AND PIZZA PRODUCT

(75) Inventor: Jon Frank Newsom, Sylvania, OH (US)

(73) Assignee: Little Caesar Enterprises, Inc., Detroit, MI (US)

( * ) Notice: Subject to any disclaimer, the term of this patent is extended or adjusted under 35 U.S.C. 154(b) by 1397 days.

(21) Appl. No.: 11/561,015

(22) Filed: Nov. 17, 2006

(65) Prior Publication Data

US 2007/0116803 A1    May 24, 2007

Related U.S. Application Data

(60) Provisional application No. 60/739,009, filed on Nov. 23, 2005.

(51) Int. Cl.
*A21D 13/00* (2006.01)
*A21D 6/00* (2006.01)
*A21D 10/00* (2006.01)

(52) U.S. Cl.
USPC .............................. 426/94; 426/496; 426/549

(58) Field of Classification Search
USPC .................... 426/94, 138, 496, 499, 549, 520
See application file for complete search history.

(56) References Cited

U.S. PATENT DOCUMENTS

| 4,285,979 | A | | 8/1981 | Izzi |
| 5,520,942 | A | * | 5/1996 | Sauer et al. .................... 426/289 |
| 5,716,658 | A | * | 2/1998 | Donnelly et al. ............. 426/420 |
| 6,261,613 | B1 | | 7/2001 | Narayanaswamy et al. |
| 6,733,808 | B2 | * | 5/2004 | Gosselin et al. ............. 426/113 |
| 6,884,443 | B2 | | 4/2005 | Domingues et al. |
| 6,919,097 | B2 | * | 7/2005 | Lamp et al. ..................... 426/94 |
| 6,942,885 | B2 | * | 9/2005 | Ross et al. ...................... 426/94 |
| 7,097,038 | B2 | | 8/2006 | Kinigakis |
| 2003/0044489 | A1 | * | 3/2003 | Waszyk et al. .................. 426/94 |

OTHER PUBLICATIONS

NPL: Sharon Tylor Herbst in The Food Lover's Companion, 2nd edition, copyright Baron's Educational Services, Inc., 1995. http://allrecipes.com/HowTo/garlic-butter/Detail.aspx.*
"About Pizza Hut," Public Relations—2006 Headlines; http://64.233.167.104/search?q=cache:WekereStRy0J:www.pizzahut.com/about/publicrela . . . ; pp. 1-2(Mar. 20, 2007).

* cited by examiner

*Primary Examiner* — Humera Sheikh
*Assistant Examiner* — Bhaskar Mukhopadhyay
(74) *Attorney, Agent, or Firm* — Honigman Miller Schwartz and Cohn LLP

(57) ABSTRACT

A combined pizza and breadsticks food product, includes a crust/bread made from flour and yeast and defining a pizza crust portion integrally formed with a plurality of bread sticks. The crust/bread has a first score line separating the pizza crust portion from the plurality of bread sticks and a plurality of second score lines disposed between adjacent ones of the plurality of bread sticks.

12 Claims, 1 Drawing Sheet

COMBINATION BREADSTICKS AND PIZZA PRODUCT

CROSS-REFERENCE TO RELATED APPLICATIONS

This application claims the benefit of U.S. Provisional Application No. 60/739,009, filed on Nov. 23, 2005. The disclosure of the above application is incorporated herein by reference.

FIELD

The present disclosure relates to pizza and breadstick food products and more particularly, to a combination breadstick and pizza product.

BACKGROUND AND SUMMARY

The statements in this section merely provide background information related to the present disclosure and may not constitute prior art.

Pizza and breadsticks are increasingly popular foods that are traditionally sold together by pizzerias. The pizza and breadsticks are prepared separately from one another and sold as separate menu items.

Frozen pizza is also commonly sold in grocery store freezer sections while breadsticks are also sold in grocery stores as fresh baked or as a frozen or refrigerated food product.

The present disclosure provides a combined pizza and breadsticks food product, including a crust/bread made from flour and yeast and defining a pizza crust portion integrally formed with a plurality of bread sticks. The crust/bread has a first score line separating the pizza crust portion from the plurality of bread sticks and a plurality of second score lines disposed between adjacent ones of the plurality of bread sticks.

According to a further aspect of the present disclosure, the first score line generally separates the crust/bread in half.

According to a further aspect of the present disclosure, the pizza crust portion is generally rectangular and the plurality of breadsticks combine to generally form a rectangle.

According to a further aspect of the present disclosure, the plurality of breadsticks include cinnamon and sugar disposed thereon.

According to a further aspect of the present disclosure, the first score line is generally perpendicular to the plurality of second score lines.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

Figure 1:
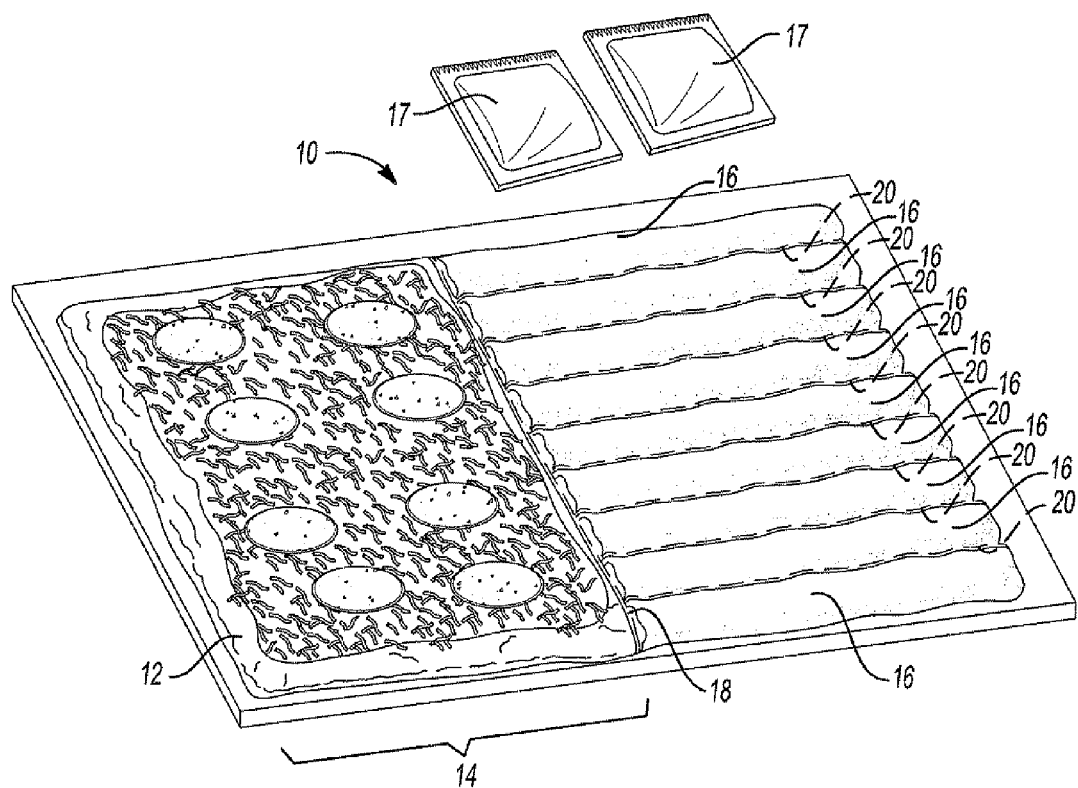
Figure 2:
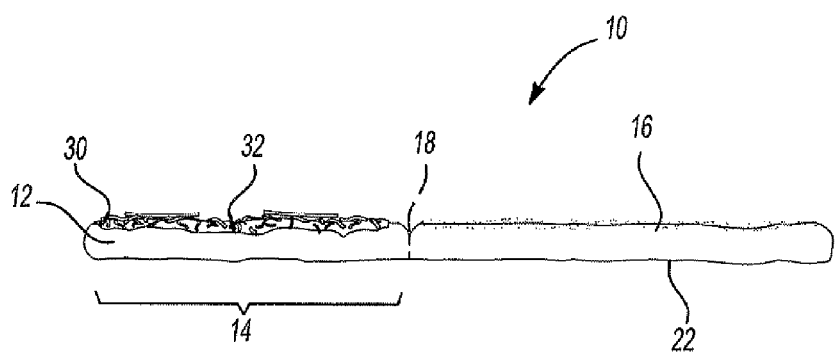

FIG. 1 is a top plan view of the combination breadsticks and pizza food product according to the principles of the present invention; and FIG. 2 is a cross-sectional view of the combination breadsticks and pizza food product.

DETAILED DESCRIPTION

The following description is merely exemplary in nature and is not intended to limit the present disclosure, application, or uses. It should be understood that throughout the drawings, corresponding reference numerals indicate like or corresponding parts and features.

With reference to FIGS. 1 and 2, the combination breadsticks and pizza product according to the principles of the present disclosure will now be described. The combination breadsticks and pizza product 10 includes a flour and yeast based crust/bread 12 (hereinafter referred to as "bread 12") defining a pizza crust portion 14 and a plurality of breadsticks 16. The bread 12 includes a first score line 18 separating the pizza crust portion 14 from the plurality of breadsticks 16 and a plurality of second score lines 20 disposed between adjacent ones of said plurality of breadsticks 16.

In the embodiment shown, the bread 12 is generally formed as a square, although other shapes such as rectangle, circular and oval can also be utilized. The first score line 18 generally separates the bread 12 in half so that the pizza crust portion 14 defines approximately one half of the bread 12. The pizza crust portion 14 is preferably topped with selected pizza toppings such as tomato sauce, cheese, pepperoni and/or other traditional pizza toppings. Without intending to be limited thereto, the additional pizza toppings can include, ham, sausage, bacon, onions, mushrooms, peppers, olives, pineapple, and other meat and vegetable toppings.

The plurality of breadsticks 16 can be covered with cheese, alternatively, sprinkled with a garlic buttery sauce, or can be topped with cinnamon and sugar or other toppings as desired. The breadstick toppings can be packaged in separate packets 17 as shown in FIG. 1. The first score line 18 and the plurality of second score lines 20 define regions of decreased thickness in the bread that facilitate the tearing apart of the individual breadsticks away from the pizza slices. In addition, a score line can also be provided to separate different portions of the pizza crust portion 14 in order to facilitate the separation of multiple pizza slices from one another. In the embodiment shown, the pizza crust portion 14 and breadstick portion 16 are each generally rectangular in shape and the plurality of second score lines 20 are generally perpendicular to the first score line 18 so as to define eight breadsticks and two slices of pizza on a single bread 12. The score lines 18, 16 can be pressed into the dough prior to par baking, or alternatively can be pressed into the par baked crust prior to the application of the toppings to the pizza slices.

The crust/bread 12 is preferably a par baked dough that is made from flour and yeast and may further include water, sugar, honey, vegetable oil, salt, baking soda, cellulose gum, food starch, corn syrup, wheat gluten, dough conditioners and other natural and artificial flavors. According to one embodiment, the crust is par baked and topped with selected toppings as identified above, and packaged and refrigerated or frozen.

The packaged pizza can then be removed from the refrigerator or freezer and allowed to thaw. The pizza is then preferably placed in a preheated oven at 425 degrees Fahrenheit directly on the oven rack. The pizza is then baked for 7 to 9 minutes or until the edges of the crust 12 are golden brown and the cheese is melted well. After removal of the combination breadstick and pizza product, a garlic buttery sauce can be evenly spread over the breadsticks and either a seasoning mix or parmesan cheese can be added over the product.

With alternative embodiments, the breadsticks can be topped with cheese which is applied to the breadsticks prior to being baked, or alternatively can be topped with butter and cinnamon and sugar either prior to or after baking.

As shown in FIG. 2, the par baked dough that forms the bread 12 has a generally flat bottom surface 22 and the score line 18 is disposed in a top surface of the par baked dough. In the embodiment shown, it is preferred that the breadsticks have a dimension of approximately 16 millimeters in height, 120 millimeters in length and a width of approximately 30 millimeters. Each square pizza slice may have a raised rim 30 having a height of 15.7 to 19 millimeters and a floor 32 disposed inside of the rim having a height of 5 to 7 millimeters. Each slice may have a length of 120 to 125 millimeters and a width of 120 to 125 millimeters. Each of the above-listed dimensions are for exemplary purposes only, and it should be understood that other dimensions could be utilized.

What is claimed is:

1. A combined pizza and breadsticks food product, comprising:
   a bread defining a pizza crust portion and a plurality of bread sticks connected to said pizza crust portion, said bread being made of a single recipe, said pizza crust portion having a raised rim portion extending above and substantially around a reduced height floor portion, said bread defining a first score line separating said pizza crust portion from said plurality of bread sticks and a plurality of second score lines disposed between adjacent ones of said plurality of bread sticks.

2. The food product of claim 1, wherein said pizza crust portion is generally rectangular.

3. The food product of claim 1, wherein said plurality of breadsticks combined generally form a rectangle.

4. The food product of claim 1, wherein said pizza crust portion includes a tomato sauce and cheese disposed thereon.

5. The food product of claim 1, wherein said plurality of breadsticks include cinnamon and sugar disposed thereon.

6. The food product of claim 1, wherein said plurality of breadsticks include cheese thereon.

7. The food product of claim 1, wherein said first score line is generally perpendicular to said plurality of second score lines.

8. The food product of claim 1, wherein said bread has a generally flat bottom surface.

9. The food product of claim 8, wherein said first score line and said plurality of second score lines are disposed in a top surface of said bread.

10. The food product of claim 1, wherein said plurality of breadsticks include a garlic buttery sauce thereon.

11. The food product of claim 1, wherein said bread is partially baked.

12. The food product of claim 1, wherein said first score line generally separates said bread in half.

* * * * *